United States Patent
Weeramantry

(10) Patent No.: US 11,220,171 B2
(45) Date of Patent: Jan. 11, 2022

(54) DRIVETRAIN ARCHITECTURE

(71) Applicant: Cecil A. Weeramantry, Walnut Creek, CA (US)

(72) Inventor: Cecil A. Weeramantry, Walnut Creek, CA (US)

(*) Notice: Subject to any disclaimer, the term of this patent is extended or adjusted under 35 U.S.C. 154(b) by 205 days.

(21) Appl. No.: 16/425,137

(22) Filed: May 29, 2019

(65) Prior Publication Data
US 2019/0366832 A1 Dec. 5, 2019

Related U.S. Application Data

(60) Provisional application No. 62/677,692, filed on May 30, 2018.

(51) Int. Cl.
*B60K 6/365* (2007.10)
*B60K 6/42* (2007.10)
(Continued)

(52) U.S. Cl.
CPC ............. *B60K 6/42* (2013.01); *B60K 6/365* (2013.01); *B60K 6/387* (2013.01); *B60K 6/445* (2013.01); *B60W 10/02* (2013.01); *B60W 10/08* (2013.01); *B60W 10/115* (2013.01); *B60W 20/40* (2013.01); *B60K 1/02* (2013.01); *B60K 6/54* (2013.01); *B60K 2006/381* (2013.01); *B60W 20/10* (2013.01); *B60W 2510/244* (2013.01); *B60W 2520/10* (2013.01);
(Continued)

(58) Field of Classification Search
CPC ..... F16H 2001/2881; F16H 2200/2005; F16H 2200/2033; B60K 1/02; B60K 6/42; B60K 6/445; B60K 6/35; B60W 10/115; B60W 10/08; B60W 6/54; B60W 20/10

USPC ............................................. 475/5, 150, 317
See application file for complete search history.

(56) References Cited

U.S. PATENT DOCUMENTS 5,558,175 A  9/1996 Sherman
5,558,589 A  9/1996 Schmidt
(Continued)

FOREIGN PATENT DOCUMENTS

CN  00020239987 U  8/2012
CN  203543619 U * 4/2014
(Continued)

OTHER PUBLICATIONS

English translation of CN107512168A; http://translationportal.epo.org; Apr. 20, 2021 (Year: 2021).*

*Primary Examiner* — Roger L Pang
(74) *Attorney, Agent, or Firm* — Rathe Lindenbaum LLP

(57) ABSTRACT

A drivetrain architecture may include a first shaft for connection to a torque source, a first sun gear attached to the first shaft, a second sun gear attached to a second shaft, a first planet gear attached to a third shaft and in meshing engagement with the first sun gear, a second planet gear attached to the third shaft, a ring gear attached to a fourth shaft and in meshing engagement with the second planet gear, a planet carrier attached to a fifth shaft, the planet carrier supporting the third shaft, a sixth shaft for connection to a first motor generator, a seventh shaft for connection to a second motor generator, a first gear set connecting the second shaft and the sixth shaft, a second gear set connecting the fourth shaft and an eighth shaft and a third gear set connecting the fifth shaft and the seventh shaft.

15 Claims, 16 Drawing Sheets

(51) Int. Cl.
*B60W 10/02* (2006.01)
*B60W 10/08* (2006.01)
*B60K 6/445* (2007.10)
*B60K 6/387* (2007.10)
*B60W 10/115* (2012.01)
*B60W 20/40* (2016.01)
*B60K 6/38* (2007.10)
*F16H 1/28* (2006.01)
*B60K 6/54* (2007.10)
*B60K 1/02* (2006.01)
*B60W 20/10* (2016.01)

(52) U.S. Cl.
CPC ............... *F16H 2001/2881* (2013.01); *F16H 2200/2005* (2013.01); *F16H 2200/2033* (2013.01)

(56) References Cited

U.S. PATENT DOCUMENTS

| | | |
|---|---|---|
| 5,558,595 A | 9/1996 | Schmidt |
| 5,904,631 A | 5/1999 | Morisawa |
| 5,931,757 A | 8/1999 | Schmidt |
| 6,090,005 A | 7/2000 | Schmidt et al. |
| 6,209,672 B1 | 4/2001 | Severinsky |
| 6,551,208 B1 | 4/2003 | Holmes et al. |
| 6,565,471 B2 | 5/2003 | weeramantry et al. |
| 6,852,061 B2 | 2/2005 | Schoon |
| 6,953,409 B2 | 10/2005 | Schmidt et al. |
| 7,128,675 B2 | 10/2006 | Klemen et al. |
| 7,137,919 B2 | 11/2006 | Holmes |
| 7,172,524 B2 | 2/2007 | Moeller |
| 7,753,816 B2 | 7/2010 | Chachra et al. |
| 7,798,032 B2 | 9/2010 | Schepperle et al. |
| 7,914,416 B2 | 3/2011 | Magiure et al. |
| 8,187,130 B1 | 5/2012 | Mellet et al. |
| 8,214,097 B2 | 7/2012 | Severinsky et al. |
| 8,348,805 B2 | 1/2013 | Wu et al. |
| 8,371,983 B2 | 2/2013 | Raghavan et al. |
| 8,382,624 B2 | 2/2013 | Li et al. |
| 8,449,424 B2 | 5/2013 | Schoon |
| 8,556,769 B1 | 10/2013 | Gv et al. |
| 8,597,146 B2 | 12/2013 | Holmes et al. |
| 8,602,938 B1 | 12/2013 | Conlon et al. |
| 8,633,622 B2 | 1/2014 | Chamberlin et al. |
| 8,790,201 B2 | 7/2014 | Holmes et al. |
| 8,888,637 B2 | 11/2014 | Kimes |
| 8,974,338 B2 | 3/2015 | Holmes et al. |
| 9,017,200 B2 | 4/2015 | Conlon et al. |
| 9,109,683 B2 | 8/2015 | Mellet et al. |
| 9,193,252 B2 | 11/2015 | Tuckfield et al. |
| 9,272,636 B2 | 3/2016 | Ichikawa |
| 9,539,892 B2 | 1/2017 | Ross et al. |
| 9,623,872 B2 | 4/2017 | Zhu et al. |
| 9,770,971 B1 * | 9/2017 | Oba ..................... F16H 3/725 |
| D800,198 S | 10/2017 | Branning et al. |
| 9,879,768 B2 | 1/2018 | Kolokythas |
| 9,897,194 B2 | 2/2018 | Barone et al. |
| 9,994,098 B2 | 6/2018 | Ai et al. |
| 10,077,823 B2 | 9/2018 | Ai et al. |
| 10,131,220 B2 | 11/2018 | Kum et al. |
| 10,160,306 B2 | 12/2018 | Conlon et al. |
| 10,189,344 B2 | 1/2019 | Imamura et al. |
| 10,189,462 B2 | 1/2019 | Miyamoto et al. |
| 10,193,415 B2 | 1/2019 | Ihben et al. |
| 10,195,930 B2 | 2/2019 | Endo et al. |
| 10,195,932 B2 | 2/2019 | Brehmer et al. |
| 10,197,151 B2 | 2/2019 | Nishimine |
| 10,214,093 B2 | 2/2019 | Banshoya et al. |
| 10,220,698 B2 | 3/2019 | Shibata et al. |
| 10,227,068 B2 | 3/2019 | Takagi et al. |
| 10,279,672 B2 | 5/2019 | Ziemer |
| 11,046,167 B2 | 6/2021 | Hao |
| 2008/0171625 A1 | 7/2008 | Goldschmidt et al. |
| 2011/0111907 A1 * | 5/2011 | Kim ..................... B60K 6/445 475/5 |
| 2012/0238389 A1 | 9/2012 | Schoon |
| 2014/0296013 A1 * | 10/2014 | Hata ..................... B60K 6/365 475/5 |
| 2017/0144527 A1 | 5/2017 | Ziemer |
| 2017/0197613 A1 | 7/2017 | Gv et al. |
| 2017/0313173 A1 | 11/2017 | Kimes et al. |
| 2019/0118641 A1 | 4/2019 | Zhang et al. |

FOREIGN PATENT DOCUMENTS

| | | |
|---|---|---|
| CN | 203743320 U | 7/2014 |
| CN | 205559760 U | 4/2016 |
| CN | 106458003 A | 2/2017 |
| CN | 000107512168 | 12/2017 |
| CN | 111114289 A * | 5/2020 |
| CZ | 201058 A3 | 1/2010 |
| DE | 2208036 A1 | 8/1972 |
| DE | 102007004464 A1 | 7/2008 |
| DE | 102010049550 A1 | 4/2012 |
| DE | 102013005719 B3 | 8/2014 |
| FR | 2604313 A1 | 3/1988 |
| KR | 100756695 | 3/2007 |
| KR | 1020070119763 | 12/2007 |
| KR | 102184282 B1 | 11/2020 |
| WO | WO2007003291 | 1/2007 |

* cited by examiner

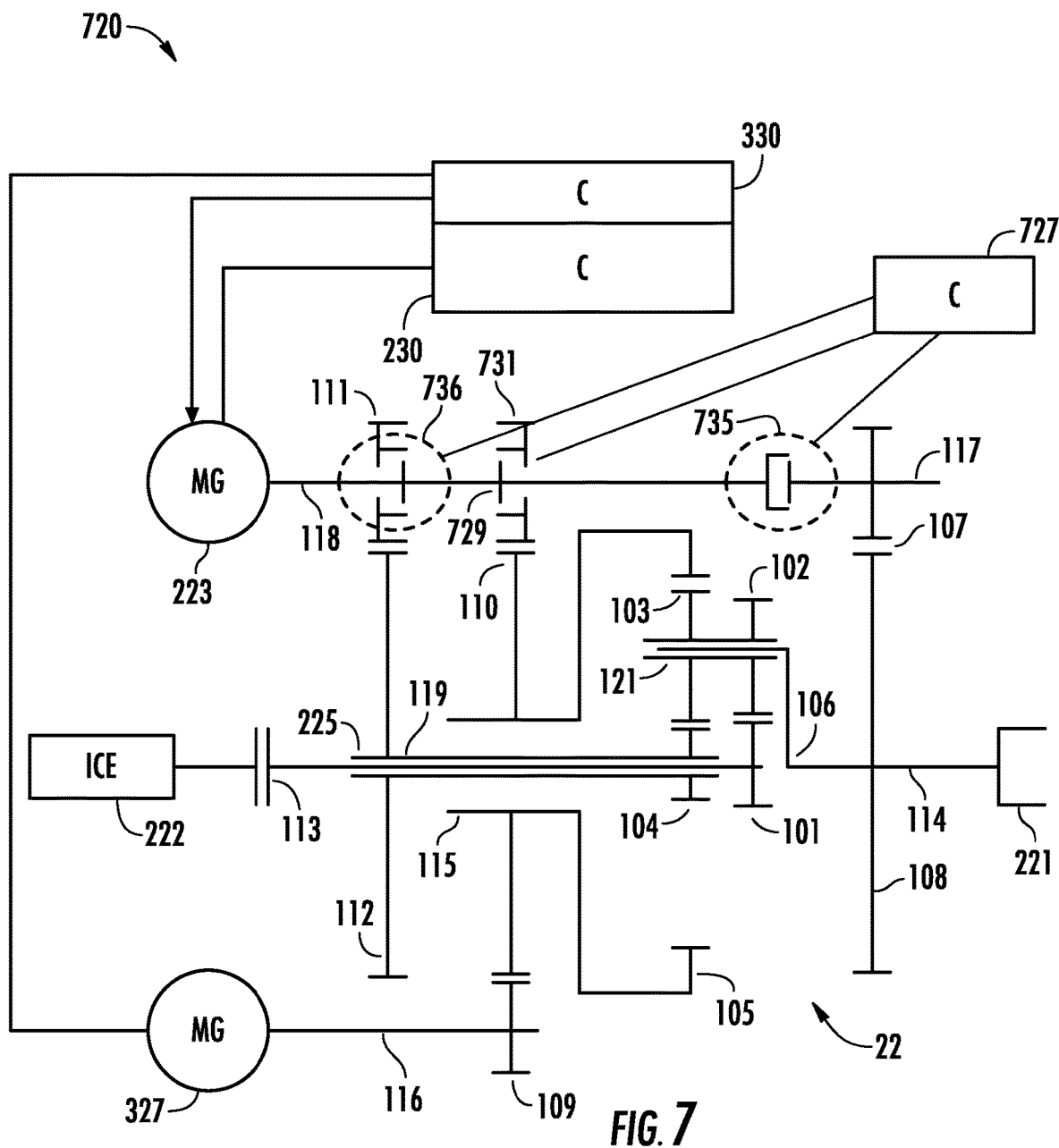

DRIVETRAIN ARCHITECTURE

The present application is a non-provisional patent application claiming priority from U.S. provisional patent application Ser. No. 62/677,692 filed on May 30, 2018 by Cecil A. Weeramantry, the full disclosure of which is hereby incorporated by reference.

BACKGROUND

Although many advancements have been made with smaller vehicles there are major challenges in extending to larger vehicle such as trucks, tractor trailers and off-road haulage vehicles. One of the major stumbling blocks is the battery capacity and cost. Other major issues such as driving range and availability of charging facilities/charging time are also significant. Furthermore, additional cost and weight of the electrical equipment such as motors and control systems also come into play.

In electric vehicles the strategy adopted (i.e. externally charged battery powering electric motor/s) is pretty much similar across the board. However, with Hybrid and Plug-in Hybrid several strategies such as series hybrid, parallel hybrid and mixed hybrid strategies are used with significantly different architectures

BRIEF DESCRIPTION OF THE DRAWINGS

FIG. 2b is a graph depicting a performance curve of the drivetrain architecture of FIGS. 2 and 2a.

FIG. 3b is a graph depicting a performance curve of the drivetrain architecture of FIGS. 3 and 3a.

FIG. 4b is a flow diagram of an example fixed ratio attachment three motor generator control process for the drivetrain architecture of FIG. 4a.

FIG. 7 is a schematic diagram illustrating portions of an example drivetrain architecture.

Figure 1:
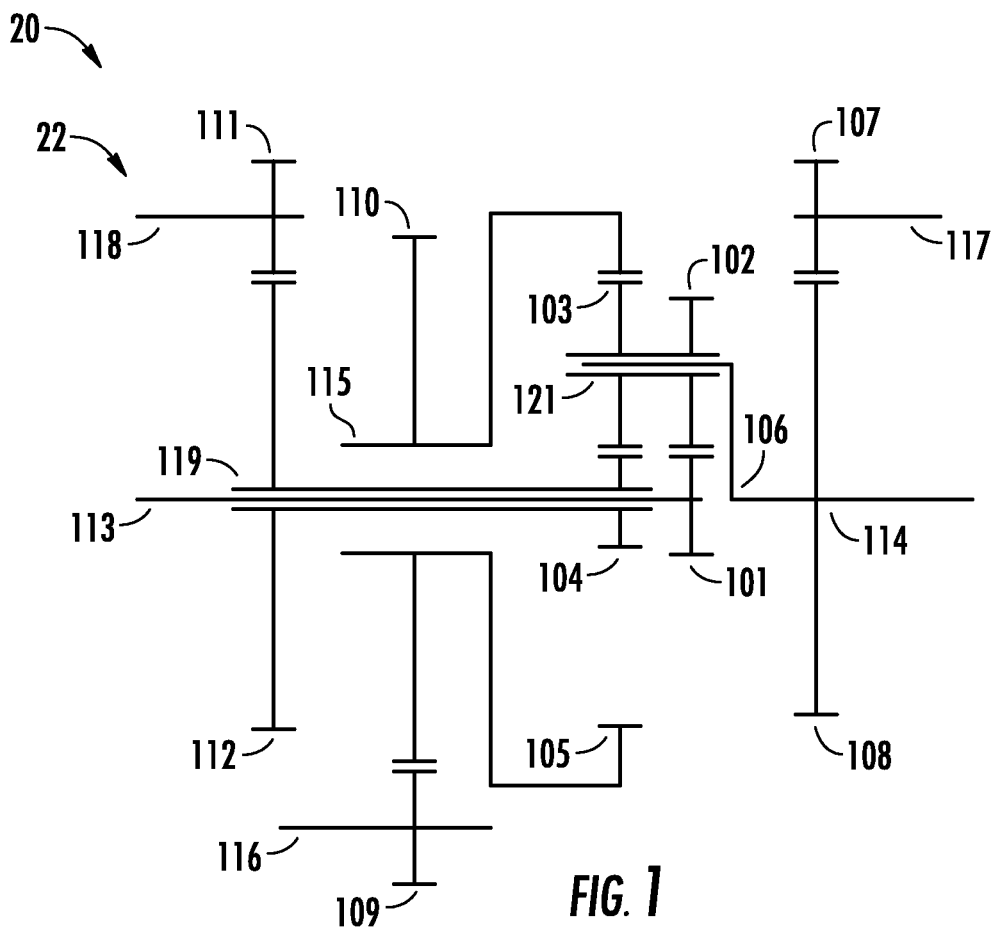
FIG. 1 is a schematic diagram illustrating portions of an example drivetrain architecture.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example drivetrain architectures that utilize a basic concept that can be adapted to a wide range of vehicles with minor changes to the architecture. The disclosed example drivetrain architectures use standard components that are mass produced in large volumes.

The disclosed drivetrain architectures center around unique features that are adaptable to vehicles all the way from light vehicles to heavy haulage vehicles. For all vehicles the goal is to improve energy efficiency by extending the range of the "all electric" operation as well as improvement in fuel economy when the IC engine is operating. For small passenger vehicles performance related to acceleration and top speed are important. For the "stop and go" type vehicles such as delivery trucks and school buses energy recapture and optimization is crucial which requires remaining in all electric mode as long as possible. For heavier vehicles, the gradeability also plays a significant part in balancing out with top speed capability. Finally, for long haul vehicle which will be running most of the time with the IC engine running the fuel efficiency at cruising speed is the major factor.

In order to achieve a balance between these conflicting goals, the example drivetrain architectures provide a multitude of modes that can be customized for different applications. This is accomplished by means of additional features and control software strategies while retaining the basic architecture.

FIG. 1 is a schematic diagram of an example drivetrain architecture 20. Architecture 20 comprises a compound planetary unit or gear train 22 with parallel axis gearing attached to it. Multiple elements of the planetary can be coupled to each other or to brakes as well as engaged to electric motor/generators and an internal combustion unit (ICE) in various combinations.

The compound planetary gear train 22 comprises two sun gears, a first sun gear in a second sun gear, coupled planet gears (also known as compound planet gears) operating on the same axis, a planet carrier supporting the planet gears and a ring gear meshing with one planet gear which also meshes with the second sun gear (sun). As shown by FIG. 1, gear train 22 comprises a first sun gear 101 attached shaft 113, a second sun gear 104 attached to shaft 119, a first and second planet gears 102 and 103 attached to shaft 121, a ring gear 105 attached to shaft 115 and a planet carrier 106 attached shaft 114. An additional gear set is provided by gears 111 and 112 (attached to shafts 118 and 119 respectively) to drive the second sun gear 104, the ring gear 105 is driven via a gear set formed by gears 109 and 110

Figure 1A:
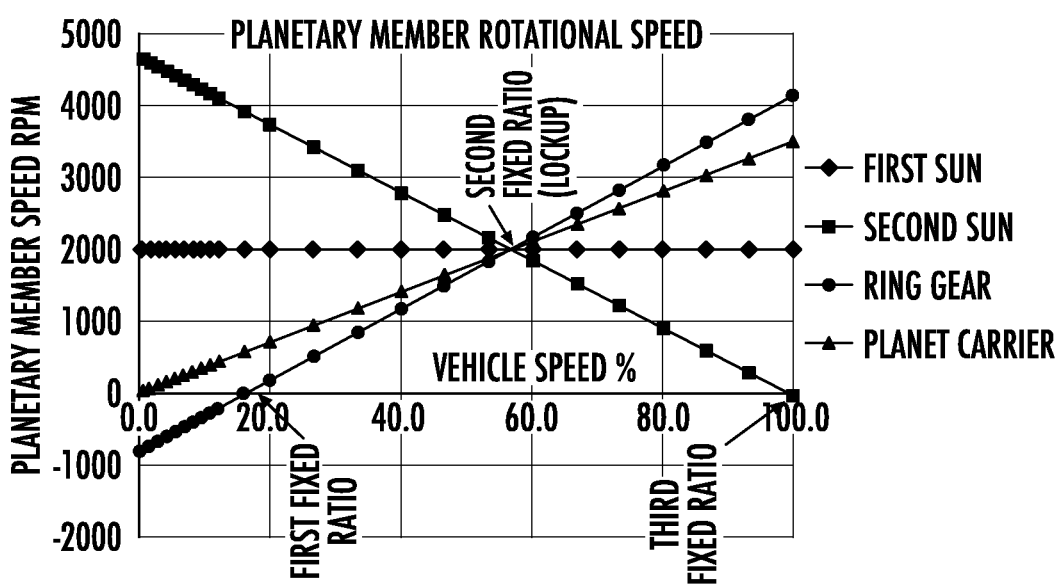
FIG. 1a is a graph illustrating the rotational speeds of various elements compared to relative vehicle speed.

(attached to shafts 116 and 115, respectively) and the planet carrier 106 is additionally driven by a gear set provided by gears 107 and 108 (attached to shafts 117 and 114 respectively). By having multiple motor generator inputs, it is possible to ensure that the motor generators and internal combustion engine are operating at optimum conditions either in pure electric or hybrid mode. The rotational speeds of the various elements in a typical application compared to relative vehicle speed are shown in FIG. 1a.

Additionally, in a hybrid mode some elements can be locked up or grounded to frame via brakes providing multiple fixed ratios (direct drive ratios). A fixed ratio is defined as a condition where all the power is transmitted mechanically at a constant gear ratio. In this case the electrical power flow is inactive (i.e. no losses in the form of heat) providing a high efficiency. Furthermore, when the electrical path is active (in hybrid mode) the "output couple" and "reaction couple" principles as shown in FIGS. 2a and 3a are used so that power in the electrical path is significantly less than the transmitted power, thus minimizing losses. In fact the electrical power approaches zero close to fixed ratio points outlined below.

It is possible to achieve up to four fixed ratios using this methodology as follows:
1. Ring Gear braked to zero speed
2. Lock-up or four square ring gear and second sun
3. Second sun braked to zero speed
4. Four square ring gear and planet carrier When the battery power runs out during electrical mode a smooth transition to the hybrid mode is achieved. The engine speed may be kept near constant by controller during entire hybrid operation.

Figure 2:
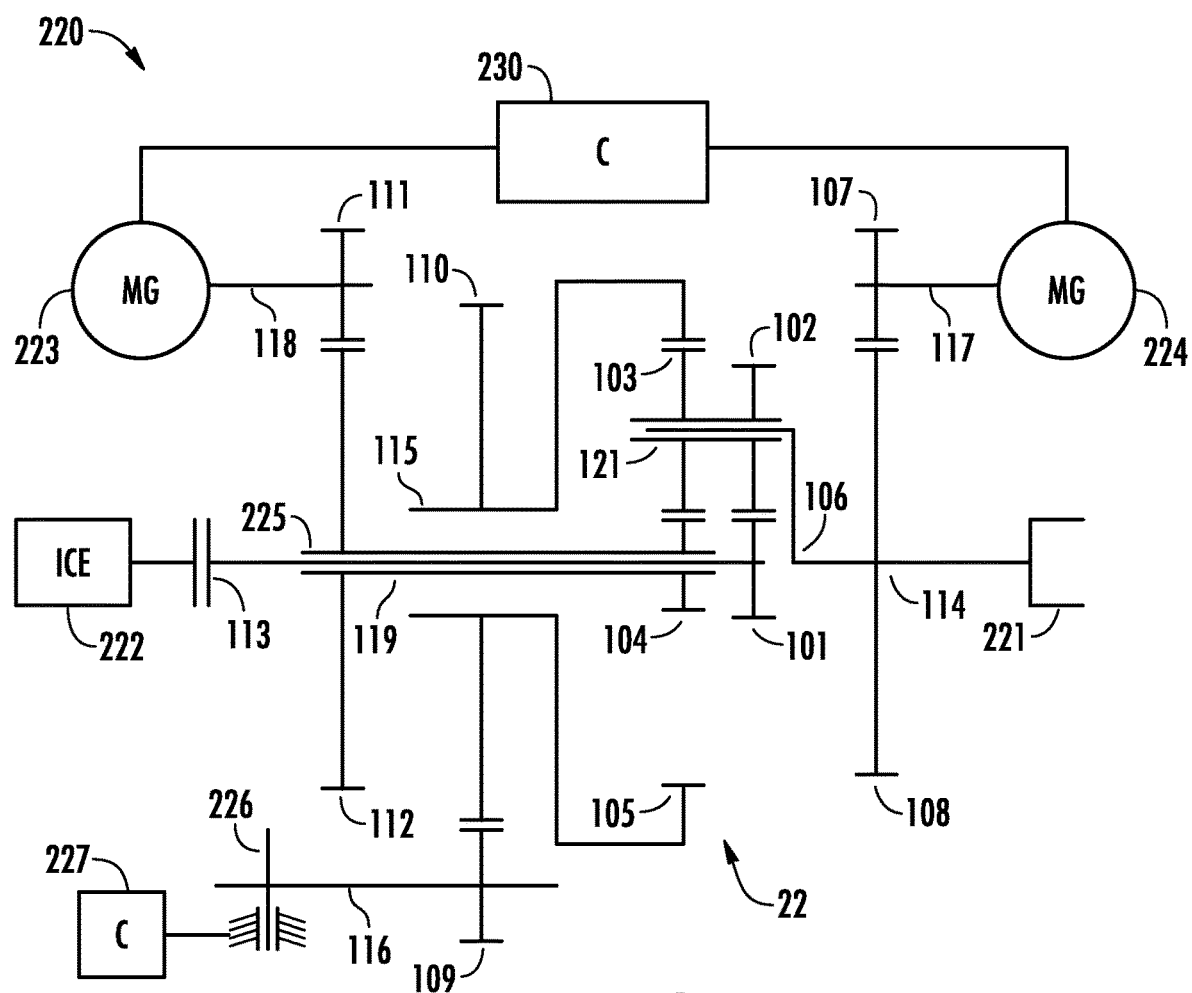
FIG. 2 is a schematic diagram illustrating portions of an example drivetrain architecture.
Figure 2A:
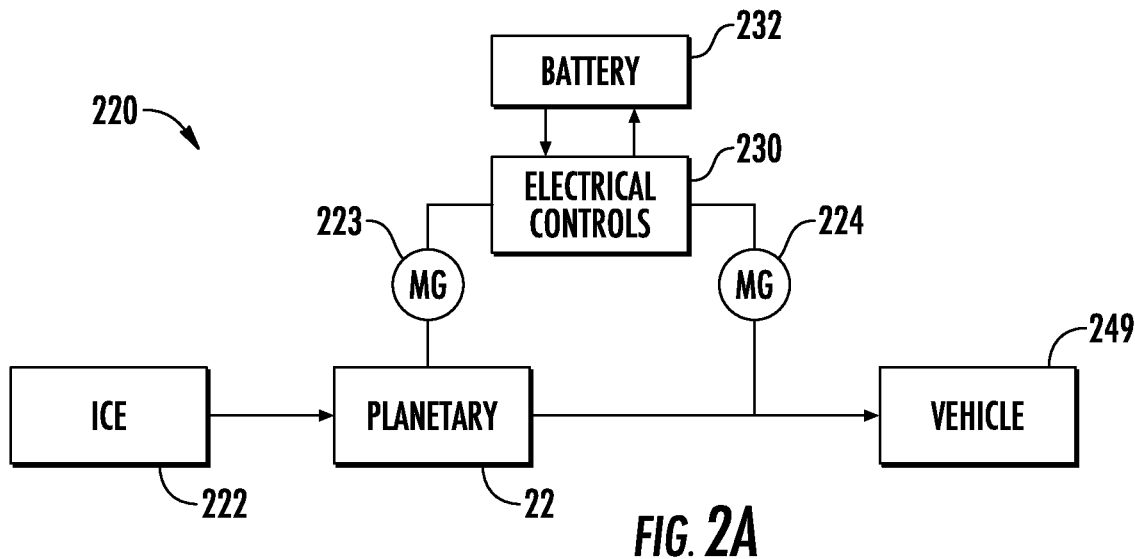
FIG. 2a is a schematic diagram illustrating an example output coupling of the drivetrain architecture of FIG. 2.

FIG. 2 is a schematic diagram illustrating portions of an example drivetrain architecture 220. Drivetrain architecture 220 is an architecture based upon two motor generators. Architecture 220 comprises the gear train 22 in combination with driveshaft output 221, internal combustion engine 222, first motor generator 223, second motor generator 224, engine clutch 225 and actuatable braked 226. Driveshaft output 221 is connected to shaft 114. Internal combustion engine (ICE) 222 is connected to shaft 113 by clutch 225. Motor generators 223 and 224 are connected to shafts 118 and 117 respectively, and are electrically output coupled. Because motor generators 223 and 224 are electrically output coupled (i.e. one motor generator connected to power output side and the other to a planetary component which is not connected to power input). Brake 226 is connected to shaft 116.

In the example illustrated, the first sun gear 101 is driven by the internal combustion engine 222 via clutch 225 and shaft 113. As stated earlier the first and second planet gears 102 and 103 are compound cluster gears on same shaft 121. The second planet gear 103 mates with ring gear 105 and second sun gear 104.

The first motor generator 223 attached to shaft 118 is coupled to second sun gear 104 via gear set 111 and 112 connected to shafts 118 and 119 respectively Second motor generator 224 (attached to shaft 117) is coupled to the planet carrier 106 via gear set provided by gears 107 and 108 connected to shafts 117 and 114 respectively. A brake 226 is connected to the ring gear 105 via Gear Set (provided by gears 109 and 110) connected to shafts 116 and 115, respectively. This can in effect hold ring gear 105 at rest under certain conditions.

First motor generator 223 and second motor generator 224 are connected to the electrical system in an "output coupled" configuration as shown in FIG. 2a. In particular, motor generators 223 and 224 are controlled by electrical controls 230 would supply power from battery 232. Electrical controls output couple motor generators 223 and 224. Drivetrain architecture 220 drives vehicle 249.

Operation in Pure Electric Mode—In one example operation (requiring nominal output torque) second motor generator 224 is powered as a traction motor. In the slow speed regime if a very high additional torque is required then first and second motor generators (223 and 224) can work together with the brake 226 energized up to a certain vehicle speed. Prolonged use of this mode is not recommended due to high energy draw from battery. Note that Clutch 225 is disengaged during electric operation but can be re-engaged to start the internal combustion engine. If the internal combustion engine 222 is already running as in some conditions then first motor generator 223 speed can be adjusted so that the clutch engagement is synchronous and smooth.

Operation in Hybrid Mode—Brake 226 is inactive and clutch 225 is engaged. First motor generator 223 is a generator powering second motor generator 224 which works as the traction motor. Torque reaction via planet carrier 106 (net due to internal combustion engine 222 and first motor generator 223) supplements torque provided by second motor generator 224. Vehicle speed is controlled by increasing speed of second motor generator 224. However, first motor generator 223 speed will decrease steadily until it is too slow to generate. This is considered the maximum vehicle speed achievable under this condition. Methodology to further increase speed using fixed ratio attachments is discussed later.

In the hybrid mode excess internal combustion engine 222 power over vehicle demand power is used to charge the battery. Typical Performance curve is shown in FIG. 2b.

The amount of power that can be absorbed by battery is dependent on its state of charge. Note that additional power going into battery will impact torque reaction at planet carrier and available output torque.

Figure 2B:
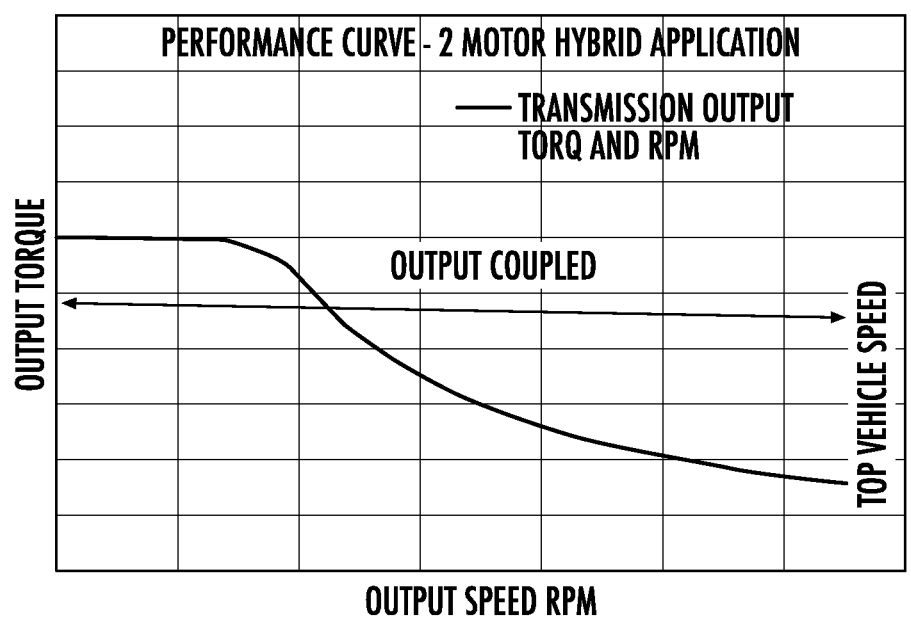
Figure 2C:
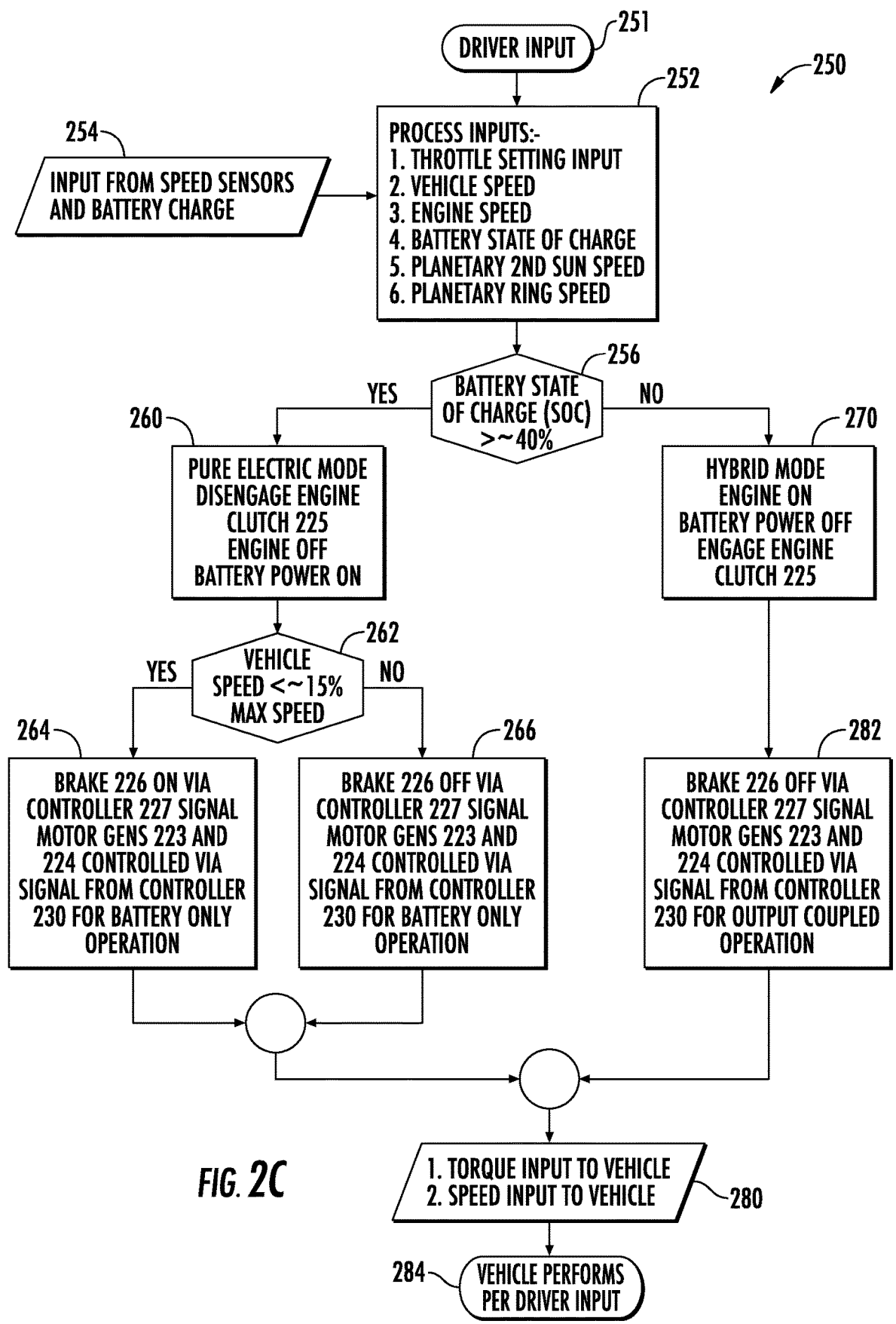
FIG. 2c is a flow diagram of an example two motor generator control process for the drivetrain architecture of FIGS. 2a and 2b.

FIG. 2c is a flow diagram of an example two motor generator control process or method 250 for the drivetrain architecture 220 of FIGS. 2a and 2b. As indicated by block 251, driver input is received by architecture 220 through various input mechanisms of the vehicle employing architecture 220. As indicated by block 252, the inputs are processed by at least one controller. Such inputs include, but are not limited to, throttle setting input, vehicle speed, engine speed, battery state of charge, planetary second sun gear speed and planetary ring gear speed. Such inputs may be provided by operator inputs or from various sensors within the vehicle that sense such values or parameters and provide signals to the controller or controllers, the signals indicating the sensed values or parameters. In the example illustrated, as indicated block 254, the throttle setting input may be filed by driver input while the remaining process inputs are provided by inputs from speed sensors and battery charge sensors.

As indicated by block 256, the battery state of charge input is compared against a predetermined charge percentage threshold, in the example, a 40% charge state threshold. In other implementations, different percentage charge thresholds may be utilized. As indicated by block 260, in response to the battery state of charge being greater than the predetermined threshold, controller or controllers because the drivetrain architecture to enter a pure electric mode. In the pure electric mode, engine 222 is disengaged through signals transmitted to clutch 225. The engine is shut off of battery power is turned on.

As indicated by block 262, the sensed or input vehicle speed is also compared against a predetermined maximum speed threshold. In the example illustrated, a 15% maximum speed threshold. In other implementations, different percentage maximum speed thresholds may be applied. As indicated by block 264, in response to the vehicle speed being less than the maximum speed percentage threshold, the controller 227 outputs control signals turning brake 226 on. Controller 230 of outputs control signals to motor generators 223 and 224 are battery only operation.

As indicated by block 266, in response to the sensor input vehicle speed being greater than or equal to the maximum speed percentage threshold, controller 227 output signals causing brake 226 to be turned off. Controller 230 output signals causing motor generators 223 and 224 to implement battery only operation.

As indicated by block 270, in response to the sensed battery state of charge being less than or equal to the battery state of charge threshold, the controller maintains a state or outputs control signals causing a change in state such that clutch 225 is engaged with the engine on and battery power off. As indicated by block 282, controller 227 outputs control signals turning brake 226 off while controller 230 outputs control signals to motor generator 223 and 224 such that motor generator 223 and 224 are in an output coupled state or operation.

As indicated by block 280, torque and speed are provided or input to the vehicle which cause the vehicle to perform per command as indicated by block 284.

Figure 3:
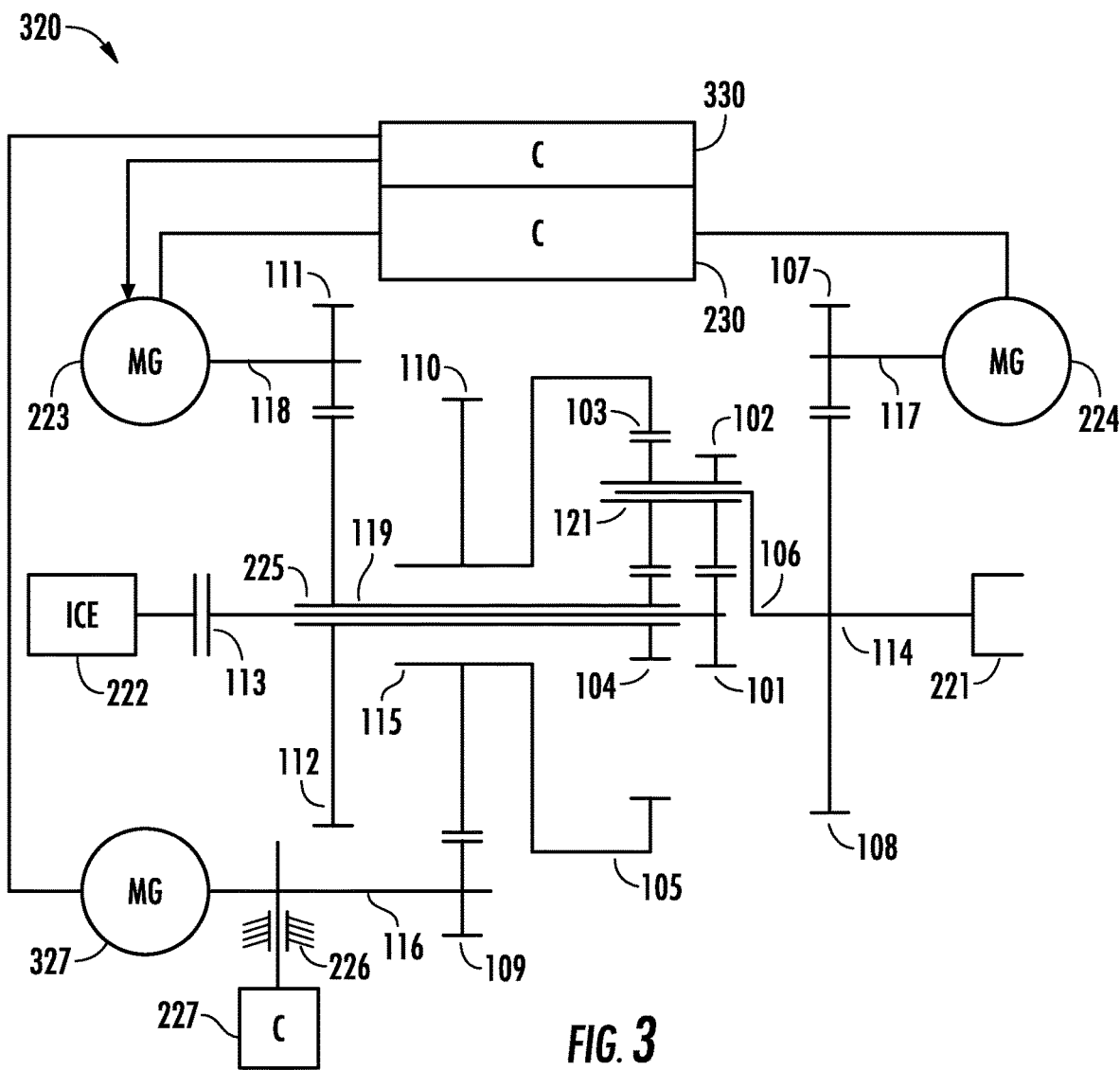
FIG. 3 is a schematic diagram illustrating portions of an example drivetrain architecture.
Figure 3A:
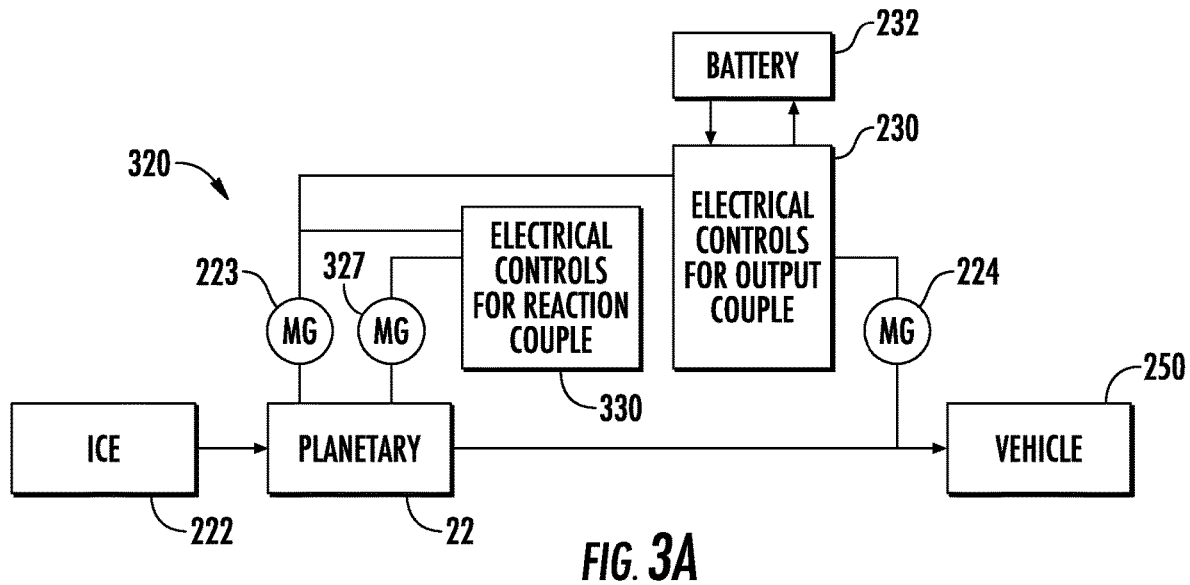
FIG. 3a is a schematic diagram illustrating an example output coupling and reaction coupling of the drivetrain architecture of FIG. 3.

FIG. 3 is a schematic diagram illustrating portions of an example drivetrain architecture 320. Drivetrain architecture 320 is similar to drivetrain architecture 220 described above except that drivetrain architecture 320 additionally comprises a third motor generator 327 which is connected to shaft 116 which supports gear 109 and brake 226. Drivetrain architecture 320 facilitates the handling of higher torque and power demands for larger vehicles.

As shown by FIG. 3, the first motor generator 223 and the third motor generator 327 are electrically connected by a controller 330 which can provide a reaction coupled configuration in hybrid operation. The internal combustion engine 222 drives the sun gear 101 via clutch 225. The electric motor generator 327 is coupled to the ring gear 105 via a parallel axis gear set. Brake 226 is connected to the ring gear 105 through gearing that hold the stationary, providing reaction torque at slow speeds and also a fixed ratio (a first fixed ratio). The planet carrier 106 drives the vehicle via a driveshaft or other gearing (not shown) the second motor generator 224 is coupled to the planet carrier 106 by a parallel axis gear set 107 and 108.

Operation in Hybrid Mode—As before at lower speeds and start up, typically, first and second motor generator (223 and 224 act in an output couple configuration. At higher speeds third motor generator 327 and first motor generator 223 work in a reaction coupled configuration (i.e. two reaction elements of the planetary namely the ring gear and second sun are electrically coupled by electrical controls 330 as shown in FIG. 3a). This greatly enhances performance and efficiency. Note that in a reaction coupled system (i.e. two reaction elements of the planetary are coupled) the power in the electrical path can be significantly less than the total power output. Typical Performance curve is shown in FIG. 3b.

It is noted that when first motor generator 223 is generating as before the resulting torque reaction on the planet carrier 106 subtracts from the torque reaction from first sun gear 101 (which has same torque as the internal combustion engine 222). This is desirable under slow speed low torque operation to prevent vehicle lunge even though first motor generator 223 is charging battery at high rate. Alternatively, when the torque demand is high third motor generator 327 can also be used for generation. This feature further enhances the versatility of the three motor/generator architecture.

Figure 3B:
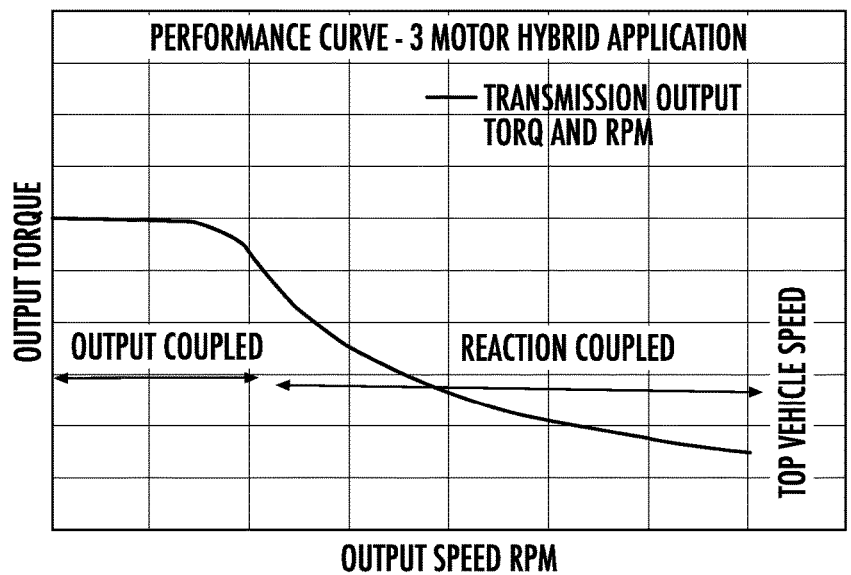
Figure 3C:
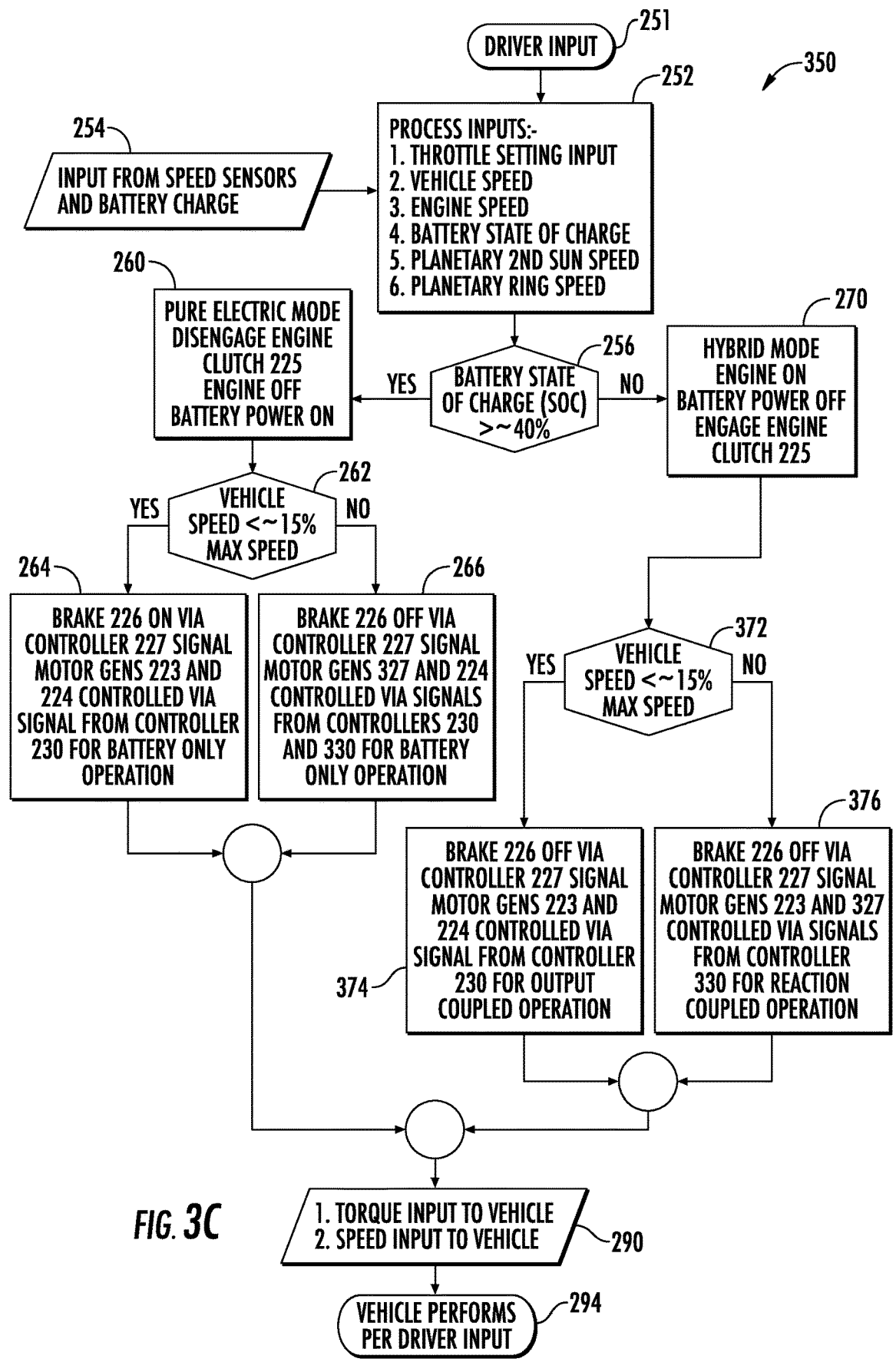
FIG. 3c is a flow diagram of an example three motor generator control process for the drivetrain architecture of FIGS. 3a and 3b.

FIG. 3c is a flow diagram of an example two motor generator control process or method 350 for the drivetrain architecture 320 of FIGS. 3a and 3b. Method 350 has a pure electric mode similar to that of method 250. Those steps are blocks of method 350 which correspond to steps or blocks of method 250 are numbered similarly. Method 350 difference or method 250 in that it can operate according to two different hybrid modes.

As indicated by block 372, in the hybrid mode of method 350, the sensed or input vehicle speed is also compared (by a controller) against a predetermined maximum speed threshold. In the example illustrated, a 15% maximum speed threshold. In other implementations, different percentage maximum speed thresholds may be applied. As indicated by block 374, in response to the vehicle speed being less than the maximum speed percentage threshold, the controller 227 outputs control signals keeps brake 226 off. Controller 230 of outputs control signals to motor generators 223 and 224 to actuate the motors to an output coupled operation (described above).

As indicated by block 376, in response to the sensor input vehicle speed being greater than or equal to the maximum speed percentage threshold, controller 227 output signals causing brake 226 to maintain in off position. Controller 330 outputs signals causing motor generators 223 and 327 to implement a reaction coupled operation.

Figure 4:
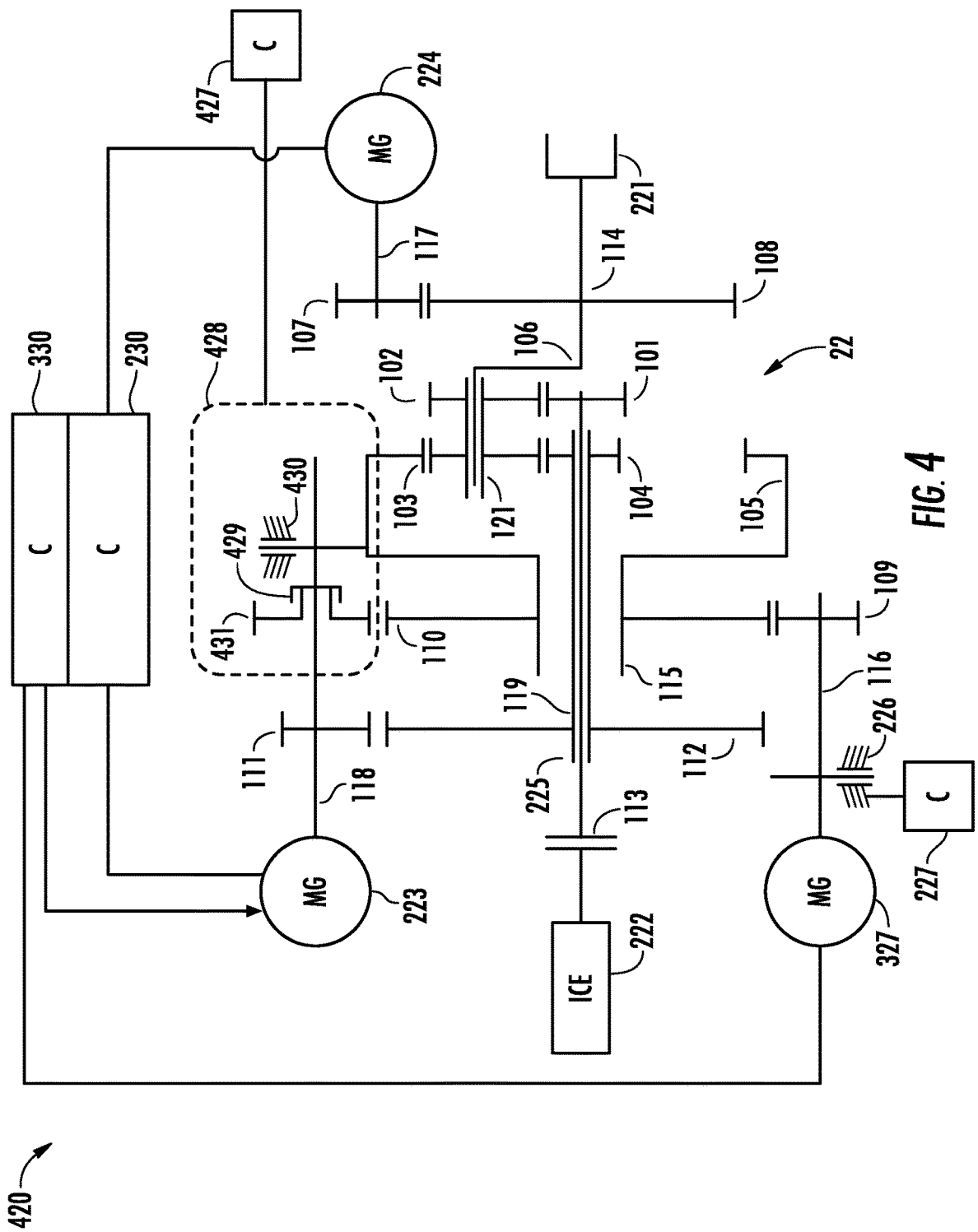
FIG. 4 is a schematic diagram illustrating portions of an example drivetrain architecture.

FIG. 4 is a schematic diagram illustrating portions of an example drivetrain architecture 420. Drivetrain architecture 420 is similar to drivetrain architecture 320 except that drivetrain architecture 420 additionally comprises a fixed ratio attachment in the form of a fixed ratio lockup clutch 429 and brake 430. and gear 431

This applies mainly to hybrid operation in either the two or three motor generator architectures. It is a given that the most energy efficient mode in hybrid operation is to transmit all the power from the internal combustion engine 222 directly to the drive shaft 221 at a fixed (mechanical) ratio while the internal combustion engine is running at its optimum efficiency point. By doing this there is close to zero loss in the electrical path since it is bypassed.

The attachment 428 shown in FIG. 4 as applied to the three motor generator architecture shows how this is accomplished by adding a lock-up clutch 429 to the same shaft as the First Motor Generator (Shaft 118). The lock-up-clutch 429 when engaged couples gear 431 (which meshes with gear 110) to shaft 118. An additional Brake 430 is also located on same shaft 118. The same methodology applies to the two motor architecture.

Operation of Fixed Ratio Function in Hybrid Modes—At start up ring gear 105 rotates in the opposite direction to Internal Combustion Engine ICE. As the vehicle speed is increased (via Second Motor Generator) Ring Gear 105 slows down until zero speed is reached. At this point brake 126 226 can be engaged synchronously (triggered by controller 227) to give first fixed ratio. It can remain in this mode if vehicle speed not changed significantly. For further increase in vehicle speed brake 226 is released and third motor generator 327 speed increased. A point will be reached around mid vehicle speed when fixed ratio lock-up clutch 429 is synchronized and can be locked up. Now the planetary four squares by virtue of second sun gear 104 and ring gear 105 being locked up in a fixed ratio resulting in a high mechanical efficiency. There are no electrical losses (except for parasitics). For further increase in speed, lock-up clutch 429 is released and third motor generator 327 speed further increased until Brake 430 can be engaged synchronously (at zero RPM). This is the third fixed ratio. This results in an over-drive condition compared to internal combustion engine speed and can be used as top vehicle speed for cruising. Again, since there is no electrical power involved this would be a very efficient operating point. The operating points are shown graphically in FIG. 4a. The rotational speed signals required to operate controllers 230, 330 227,427 etc. can be generated by measuring speed at any two elements that are operating at a constant gear ratio with a planetary element. All other speeds can then be calculated mathematically.

Additionally, during fixed ratio operation all three motor generators 223, 224 and 327 can be operated as generators to use excess power from internal combustion engine 222 to charge battery as needed or capture regenerative energy during braking. Although the engine speed is kept near constant a small change up or down should be possible to change vehicle speed.

The fourth fixed ratio referred to earlier is achieved by four squaring ring gear 105 and planet carrier 106 providing an over drive ratio beyond the third fixed described above. The principle of four squaring enables two components of the planetary to be mechanically forced to operate at a fixed speed ratio irrespective of its speed of rotation. The methodology for implementing this is described later as Variant 1.

Figure 4A:
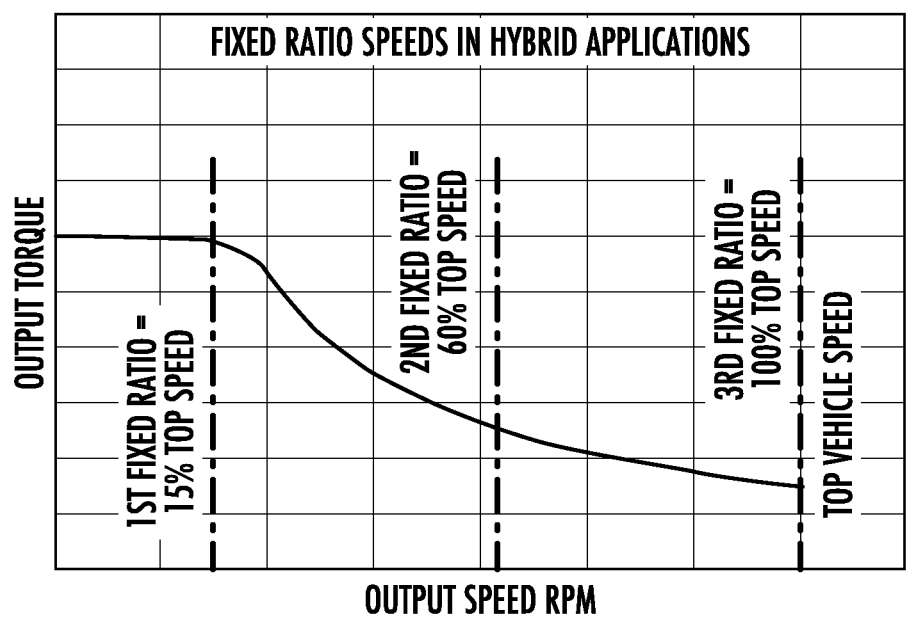
FIG. 4a is a graph illustrating fixed ratio operating points for the drivetrain architecture of FIG. 4.
Figure 4B:
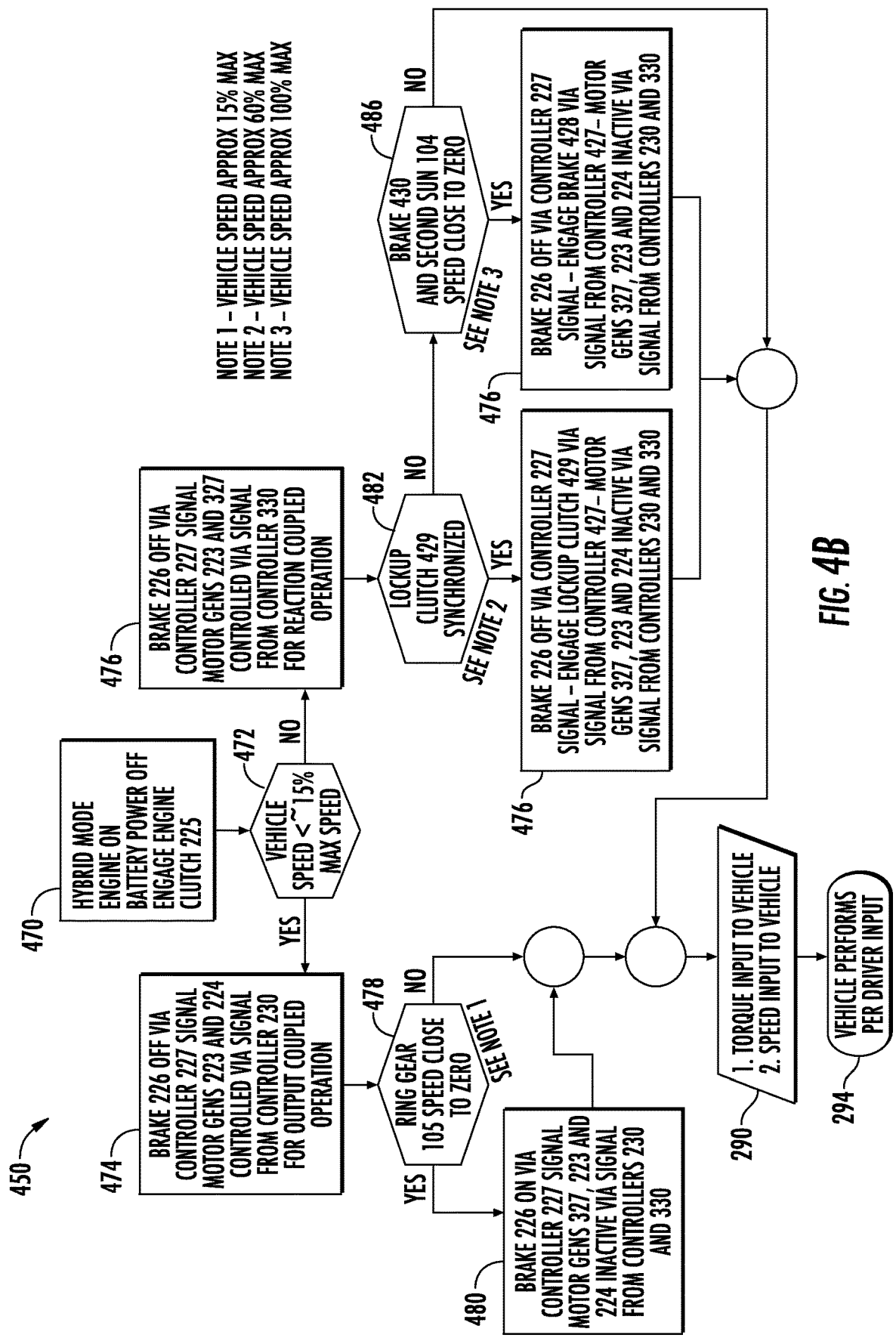

FIG. 4b is a flow diagram of an example fixed ratio attachment three motor generator control process or method 450 for the drivetrain architecture 420 of FIGS. 4 and 4a. The flow diagram shown in FIG. 4b illustrates hybrid processes, wherein pure electric processes described above with respect to methods 250 and 350 are omitted for ease of illustration. It should be appreciated that blocks 251, 252, 254, 256, 260, 262, 264 and 266 are further provided as part of method 450.

As indicated by block 470, in response to the battery state of charge being greater than the predetermined battery state of charge threshold as determined in block 256, the controller maintains a state or outputs control signals causing a change in state such that clutch 225 is engaged with the engine on and battery power off. As indicated by block 472, the sensed or input vehicle speed is also compared (by a controller) against a predetermined maximum speed threshold. In the example illustrated, a 15% maximum speed threshold. In other implementations, different percentage maximum speed thresholds may be applied.

As indicated by block 474, in response to the vehicle speed being less than the maximum speed percentage threshold, the controller 227 outputs control signals turning brake 226 off. Controller 230 of outputs control signals to motor generators 223 and 224 to actuate the motors to an output coupled operation (described above). As indicated by block 478, a controller determines whether the speed of ring gear 105 is close to zero (from a sensor). As indicated by block 480, in response to the speed of ring gear 105 being close to zero (within approximately 50 RPM of zero depending on brake design parameters), controller 227 turns brake 226 on. Controllers 230 and 330 place motor generators 327, 223 and 224 in an inactive state. In response to the ring gear 105 not being within a predetermined threshold amount of a zero value, method 450 proceeds to block 290.

As indicated by block 482, in response to the sense vehicle speed not being less than the predetermined maximum speed threshold different as determined in block 472), a controller determines whether the lockup of clutch 429 is synchronized.(synchronization implies that gear 431 and shaft 118 are approximately equal or a predetermined differential). As indicated by block 484, in response to the lockup clutch 429 being synchronized, controller 227 output signals brake 226 maintains off position. Controller 427 output signals engaging lockup clutch 429. Controllers 230 and 330 output signals inactivating motor generators 327, 223 and 224.

As indicated by block 486, in response to lockup clutch 429 not being synchronized (as determined in block 482), the controller further determines whether the brake 430 and the second sun gear 104 have a speed close to zero, the speed within a predetermined percentage or value proximate to a zero value. As indicated by block 488, in response to the brake 430 and the second sun gear 104 having a speed within the predefined threshold distance or percentage of zero, controller 227 maintains brake 226 in off position. Controller 427 output control signals engaging brake 428. Controllers 230 and 330 output control signals inactivating motor generators 327, 223 and 224. Alternatively, in response to the speed of brake 430 and second sun gear 104 not being sufficiently close to zero, not being within a predefined percentage or value of zero, method 450 proceeds to block 290.

Figure 5:
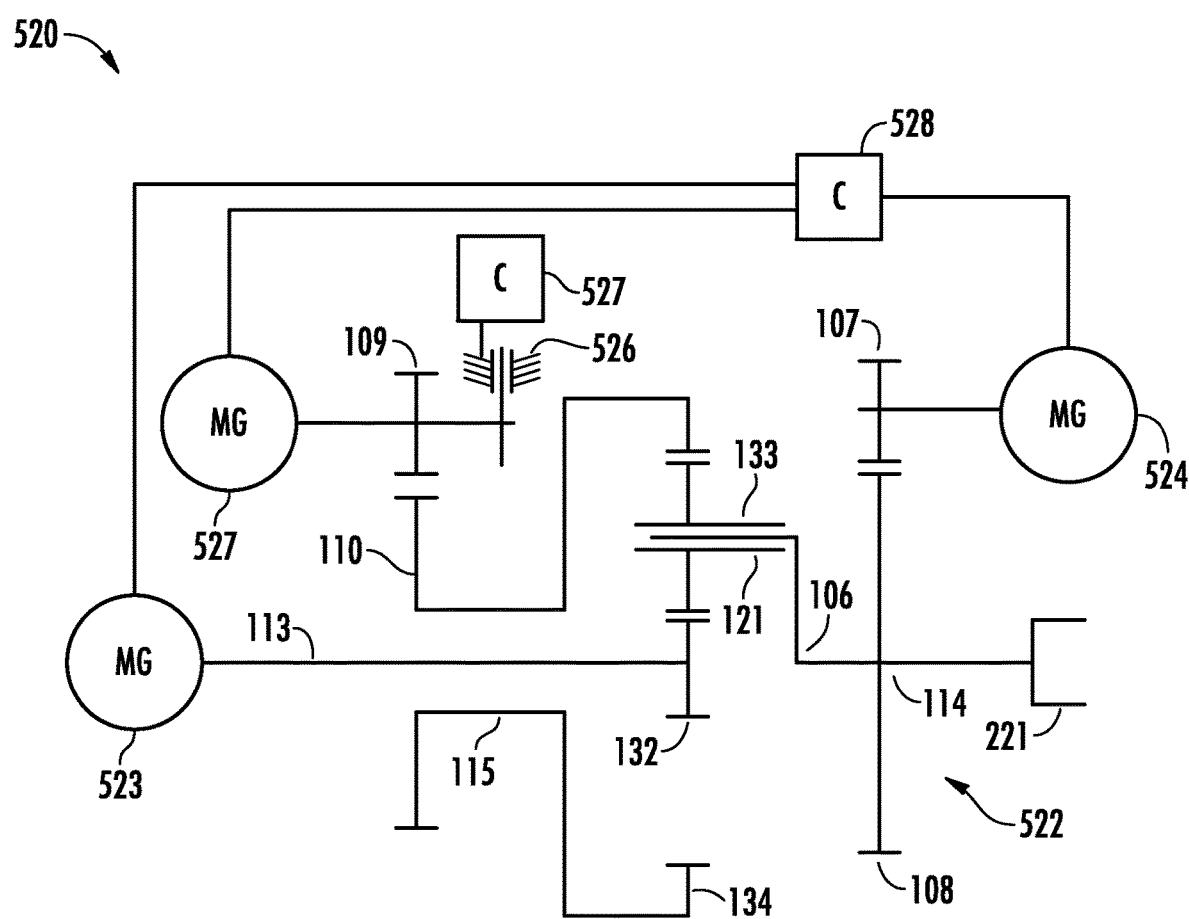
FIG. 5 is a schematic diagram illustrating portions of an example drivetrain architecture.

FIG. 5 is a schematic diagram illustrating portions of an example drivetrain architecture 520. Architecture 520 is in simplified form, dedicated for a pure electric vehicle. Pure electric vehicles typically use a single ratio gearbox to reduce output speed and increase output torque. In doing so either a large motor with shallow ratio gearing or a small motor with deep ratio gearing can be used. Obviously large motors are heavy and expensive and efficiency is low when operating at low power. On the other hand a small motor will require a deep ratio gear train to provide the low end torque but at high speed motor will run too fast resulting in low efficiency or higher cooling required.

The planetary gear train described in the two/three motor generator architectures described above can be used in a pure electric vehicle to take advantage of the multiple motor approach. Architecture 520 eliminates first sun gear 101, engine clutch 225 and of course the Internal Combustion Engine 222. A simple planetary gear-train as shown in FIG. 5 can be designed exclusively for electric vehicles to take advantage of this approach. The three motor generators 223, 224 and 327 are eliminated and replaced by motors 523, 524 and 527 as shown in FIG. 5 which can be converted to a two motor configuration for smaller vehicles by eliminating motor 527 In this case the brake 526 can be directly attached to ring gear shaft 115 and gear set (provided by gears 110 and 109) can be eliminated.

Operation of Dedicated Pure Electric Architecture

At low speeds with brake 526 is applied motor 523 or 524 or both can be used depending on torque demand. At a predetermined intermediate speed, brake 526 is released with only motor 524 (or motors 523+524+527) active. Since brake 526 is released the ring gear is unconstrained and motor 523 over speeding is prevented.

Figure 5A:
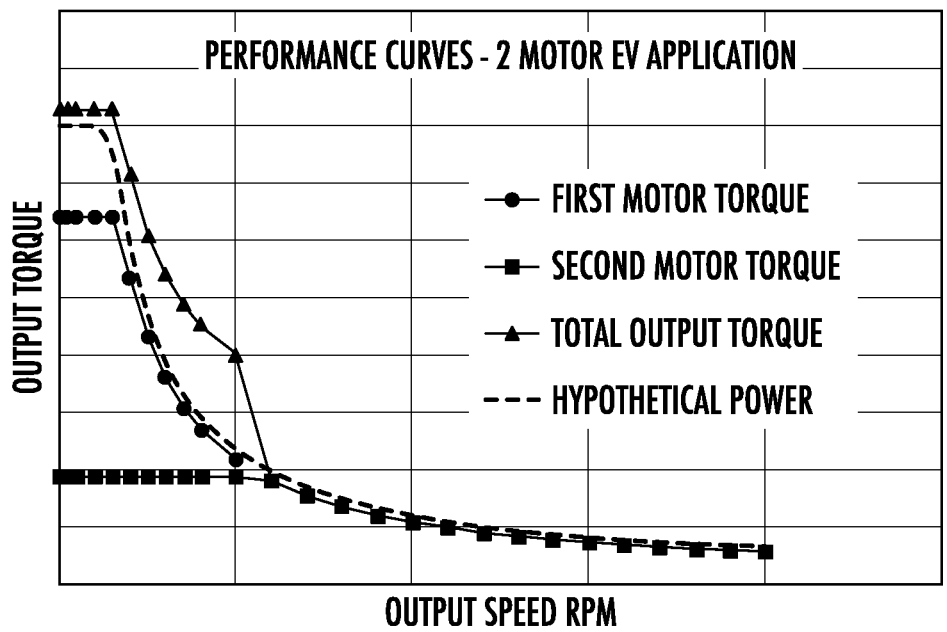
FIG. 5a is a graph illustrating fixed ratio operating points for the drivetrain architecture of FIG. 5 in a two motor pure electric application.
Figure 5B:
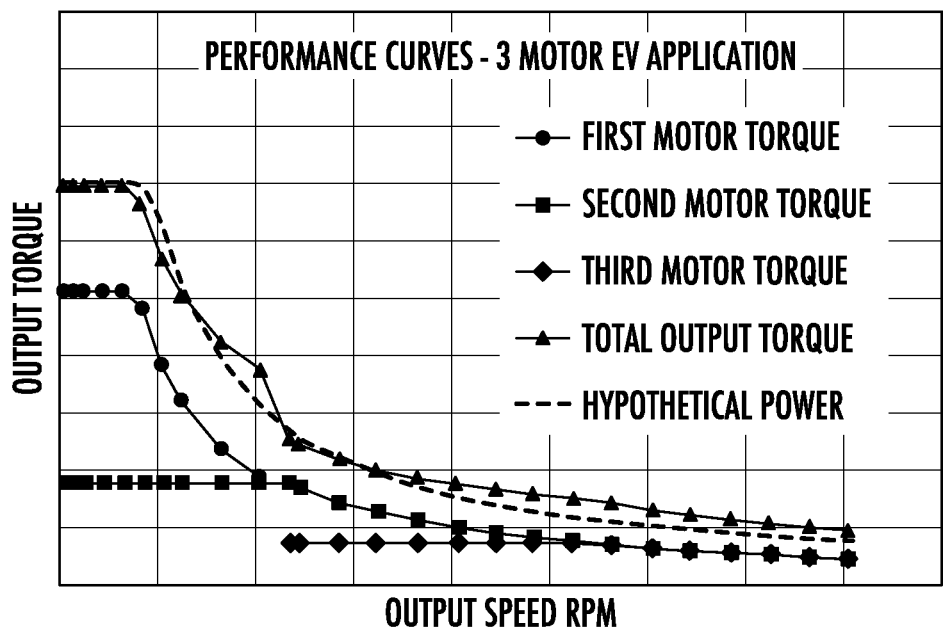
FIG. 5b is a graph illustrating fixed ratio operating points for the drivetrain architecture of FIG. 5 in a three motor pure electric application.

Performance curves for the two motor and three motor scenarios are shown in FIGS. 5a and 5b.

Figure 6:
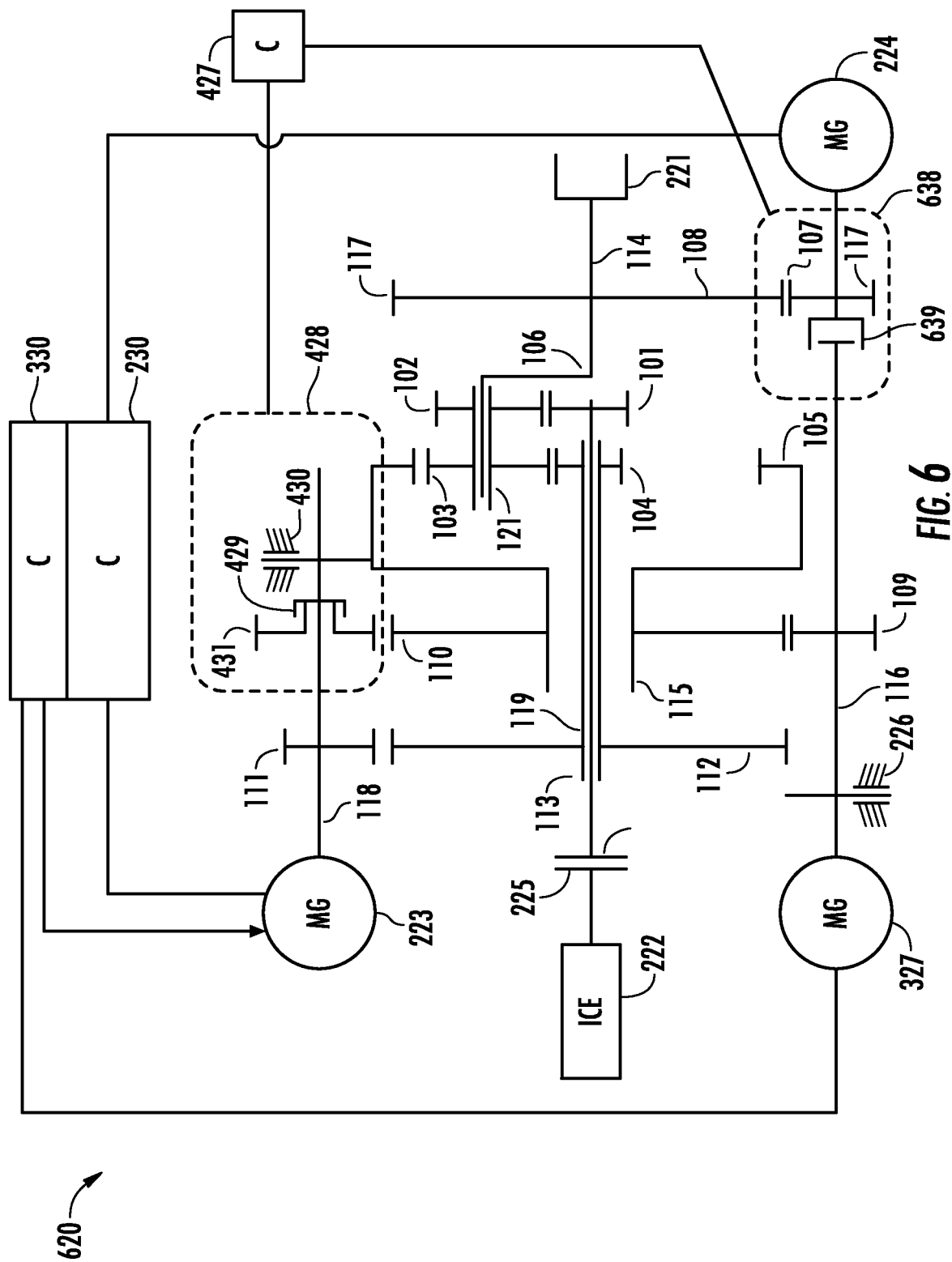
FIG. 6 is a schematic diagram illustrating portions of an example drivetrain architecture.

FIG. 6 is a schematic diagram illustrating portions of an example drivetrain architecture 620. Architecture 620 is a variant (VARIANT 1) providing an additional fixed ratio attachment for a three motor generator architecture. Architecture 620 is similar to architecture 420 described above except that architecture 620 additionally comprises a fixed ratio attachment 638 in the form of a fixed ratio lockup clutch 639. Fixed ratio lockup clutch 639 connects shaft 116 to shaft 117. Fixed ratio lockup clutch 639 is located between shaft 116 and the gear set form from gears 107 and 108 which connects shaft 117 to shaft 114.

Figure 6A:
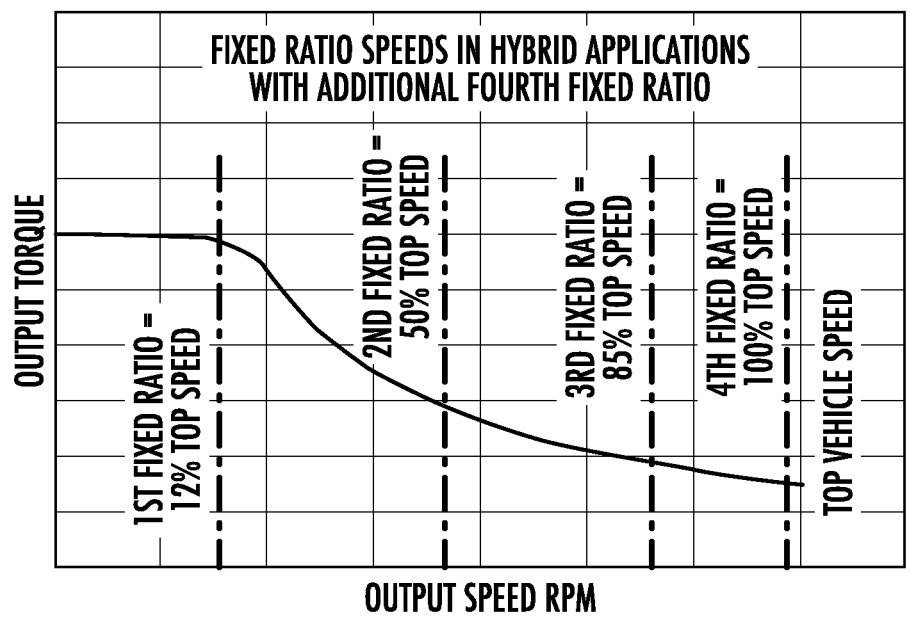
FIG. 6a is a graph illustrating fixed ratio operating points for the drivetrain architecture of FIG. 6.

VARIANT 1 as shown by FIG. 6 the same architecture described for achieving the three fixed ratios is adapted to provide an additional fixed ratio attachment 638 for achieving the fourth fixed ratio. In this proposal a fourth fixed ratio lock-up clutch 639 is synchronously engaged to provide an overdrive ratio beyond that provided by the third fixed ratio. Engagement of fourth fixed ratio lock up clutch 639 essentially four squares ring gear 105 and planet carrier 106 via the gear set (gears 109 and 110) along with gear sets (gears 107 and 108). (The principle of four squaring means that two components of the planetary—i.e. ring gear 105 and carrier 106 in this case—are mechanically forced to operate at a fixed speed ratio irrespective of its speed of rotation). The distribution of all four fixed ratios are shown in FIG. 6a.

Note that the second motor generator 224, shaft 117 and gear 107 have been relocated in-line with third motor generator 327 and shaft 116. However, functionally, this does not impact the other three fixed ratio architecture described earlier. Although the fourth fixed ratio provides a second overdrive ratio eliminating electrical losses. There is considerable recirculating mechanical power due to four squaring ring gear 105 and carrier 106 that would compromise the gain in efficiency. This should be considered in view of vehicle type and size before implementation.

FIG. 7 is a schematic diagram illustrating portions of an example drivetrain architecture 720. Drivetrain architecture 720 presents a second variant, a variant that utilizes clutches instead of brakes.

VARIANT 2

In the architecture 720 shown in FIG. 7, the two motor generator approach is used with 3 clutches and no brakes. Here again the speed torque characteristic along with the lock-up and over-drive fixed ratios are achieved. No significant advantage over previous schemes can be specified, but would be applicable to very light vehicles with possible space constraints. An additional third motor generator that is not directly attached to the gearbox, but attached to the non-driving axle(s) or wheels can be provided if additional torque output is required.

Operation of Variant 2—For pure electric mode engine clutch 225 is disengaged and clutch 735 is engaged and powered by first motor generator 223 which acts as a traction motor. For additional torque clutch 729 is also engaged at same time and third motor generator 327 is activated. For hybrid operation in lower speed clutches 225 and 735 are engaged (clutches 729 and 736 disengaged) first motor generator 223 acts as traction motor and is electrically output coupled to third motor generator 327 which generates power. For higher speed clutch 735 is released and clutch 736 engaged thus transitioning into a reaction couple mode between motor generators 223 and 327. At some point close to medium drive shaft speed clutches 729 and 736 can be synchronously engaged four squaring second sun gear 104 and ring gear 105 to provide the fixed ratio. For cruising speed clutches 735 and 729 are engaged which in effect four squares the planet carrier 106 with ring gear 105.

Figure 8:
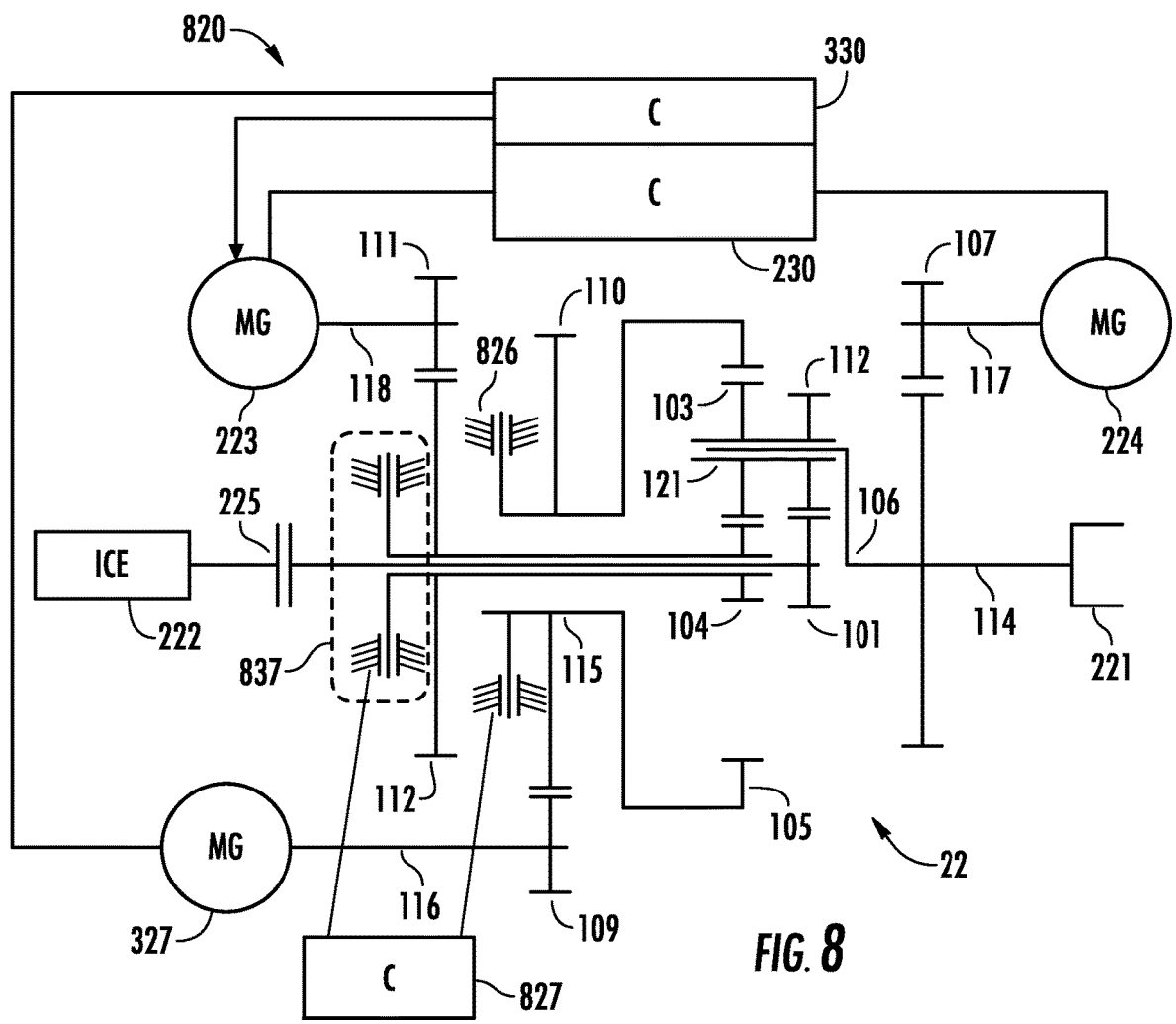
FIG. 8 is a schematic diagram illustrating portions of an example drivetrain architecture.

FIG. 8 is a schematic diagram illustrating portions of an example drivetrain architecture 820. Drivetrain architecture 820 presents a third variant that is a three motor architecture that uses "in-line" brakes while omitting clutches.

VARIANT 3—In the architecture 820 shown in FIG. 8. An in-line (with planetary axis) brake 826 is used to duplicate the functioning of the three motor generator scheme where the brake 226 was located on first motor generator shaft 116. The Fixed Ratio attachment, although not shown here, applies to this scheme as well. However, an optional second brake 837 which gives a fixed ratio at maximum cruising speed is shown in FIG. 8. In a typical architecture with two brakes such as those shown in FIG. 8 or FIG. 4, the brakes can be of the spring engaged hydraulic release type. In this case the conventional park lock or transmission lock can be eliminated since the brakes can be engaged simultaneously to hold vehicle stationary when vehicle is parked.

This architecture can be useful in situations with specific space constraints and component size limitations.

In each of the previously disclosed examples, the planet carrier 106 has been illustrated as the output of the drivetrain. However, in other implementations, the output drive may alternatively be provided via gear train or chain connected to the planet carrier 106. Such an alternative approach may be beneficial in transverse mounted situations.

Overall, the above described drivetrain architectures offer many advantages over prior systems.

Pure Electric Operation

In pure electric mode the multiple motors along with the differential action of the planetary enable the operation of motors at its optimal operating speed range in terms of efficiency. This in turn can extend range or reduce battery capacity required and reduce cooling requirements.

In a typical single motor system (either series hybrid or pure electric vehicle) would require a single reduction ratio gearbox to transmit power to the wheels. If a large reduction ratio is used to reduce size of the motor then very high motor speeds are generated at high vehicle speed. More cooling is required. On the other hand, if a smaller reduction ratio is used a large motor is required to generate low end torque. The multiple motor approach solves both problems.

High output torque at slow vehicle speed can be generated with comparatively small motors.

Capturing regenerative energy is more effective than a single motor fixed ratio system where there is little regeneration at slow vehicle speeds. In the proposed systems one motor generator works at higher speeds even close to zero vehicle speed.

Fully reversible and max torque achievable in both forward and reverse. A sprag clutch if used in lieu of the engine clutch then it will have to be reversible. Also, there is a potential noise problem with a sprag clutch In some pure electric and hybrid vehicles a multiple fixed ratio gearbox is used. This requires shifting of clutches resulting in potential torque interruption and lack of smoothness. Proposed architecture is essentially a CVT so smooth transmission of power achieved over entire speed range

Hybrid and Plug-In Hybrid Operation

Each of the above described architectures is a mixed hybrid system versus a series or parallel system. In typical series hybrid systems the entire power required to move vehicle is transmitted to wheels via the electrical path including battery. This incurs significant losses in the form of heat. In the proposed architecture less than 50% of the propulsion power is transmitted electrically. Thus, resulting in a significant improvement in efficiency as well as reduced demand for cooling.

In all current hybrid systems (i.e. Series, Parallel and Mixed) the multiple fixed ratio approach is not used. In the proposed architectures up to four ratios are possible increasing overall efficiency and reduce heat generation. These can be spaced out at low medium and high vehicle speed regimes as shown in FIG. 4a to fall at the speeds that are most heavily used. An additional fourth fixed ratio is also possible for some vehicles extending top speed even higher. This would be akin to a second overdrive ratio.

With a typical parallel hybrid system achieving high bottom end torque to match equivalent non-hybrid vehicle performance could be problematic for some off road applications. To overcome this a torque converter or a large motor generator will be required in addition to the conventional multi speed gearbox. The current invention addresses this issue by using the Planetary gearbox coupled to multiple motor generators with additional torque provided via the ring gear.

Smooth transition from electric to hybrid and in between modes is achieved by making the transitions take place synchronous internally. (i.e. CVT with no gear shifting or clutch/brake slipping). A parallel hybrid typically has a multiple speed conventional gear box that has to be shifted. The clutches are not necessarily synchronized before engagement. The potential torque interruption and lack of smoothness has to be addressed by the clutch engagement logic. Lack of a torque converter might make it more difficult.

In certain heavy duty and off-road vehicles which demand very high low-end torque, a currently used diesel engine can be potentially reduced in size or replaced with a gasoline or natural gas ICE engine. (Note that the ICE provides propulsion power while the electric motors provide propulsion torque). It is noted that the diesel engine typically is much heavier and requires more complex emission control equipment compared to gasoline engine.

In almost all hybrid modes the engine operates at or near constant speed with the electrical propulsion system acting like an electrical CVT. With the engine operating at a low constant speed it is possible operate close to maximum fuel efficiency point. Also help emission control. This is not the case in a parallel hybrid system with a gearbox.

Regeneration and battery charging using ICE power can be greatly enhanced by multiple motor/generators operating at different speeds. In fixed ratio modes it is possible to use all three motors for regeneration thus optimizing operating points for efficiency.

IC engine can be started using an auxiliary starter motor or one of the motor/generators depending on the application using master clutch (optional) between transmission and IC engine. It also facilitates smooth transfer (at synchronous speed) between pure electric and hybrid modes.

In some implementations, the motor generators may be used to generate electricity when the vehicle is stationary. This can be used for charging the onboard battery or as an external power supply. Unlike in a parallel or series hybrid system where the generator speed is equal to engine speed the generator/s can run significantly faster even at a lower engine speed. This can significantly increase electrical power output and reduce noise.

The above described drivetrain architectures are configured as an inline output drive shaft relative to engine crankshaft which would be suitable for rear wheel drive vehicles. However, an offset output drive may be easily provided with an additional gear set or chain connected to the planet carrier shaft.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A drivetrain architecture comprising:
a first electric motor;
a second electric motor; and
a single simple planetary unit with parallel axis gearing comprising:
a first shaft connected to the first electric motor;
a sun gear attached to the first shaft;
a second shaft;
a first parallel axis gear fixed to the second shaft;
a second parallel axis gear in mesh with the first parallel axis gear;
a ring gear fixedly connected to the second parallel axis gear;
a third shaft connected to the second electric motor;
a planet carrier coupled to the third shaft via gearing;
a fourth shaft supporting and fixed to the planet carrier;
a third parallel axis gear fixed to the fourth shaft;
a fourth parallel axis gear a fixed to the third shaft and in mesh with the third parallel axis gear;
a fifth shaft attached to the planet carrier and supporting a planet gear meshing with the sun gear and the ring gear; and
a brake to controllably inhibit rotation of the ring gear.

2. The drivetrain architecture of claim 1 further comprising a controller to output control signals controlling supply of power to the first electric motor.

3. The drivetrain architecture of claim 1 further comprising a controller to output control signals controlling supply of power to the second electric motor.

4. The drivetrain architecture of claim 1 further comprising a third electric motor connected to the second shaft.

5. The drivetrain architecture of claim 4 further comprising a controller to output control signals controlling supply of battery power to the third electric motor.

6. The drivetrain architecture of claim 1, wherein the fourth shaft is connected to a driveshaft output.

7. The drivetrain architecture of claim 1, wherein the brake is directly connected to the ring gear.

8. The drivetrain architecture of claim 1, wherein the simple planetary unit with parallel axis gearing is connected to torque sources consisting of electric motors comprising the first electric motor and the second electric motor.

9. A method comprising:
providing a drivetrain architecture comprising:
a controller;
a first electric motor and a second electric motor; and
a simple planetary unit with parallel axis gearing comprising:
a first shaft connected to the first electric motor;
a sun gear attached to the first shaft;
a second shaft;
a first parallel axis gear fixed to the second shaft;
a second parallel axis gear in mesh with the first parallel axis gear;
a ring gear fixedly connected to the second parallel axis gear;
a third shaft connected to the second electric motor;
a planet carrier coupled to the third shaft via gearing;
a fourth shaft supporting and fixed to the planet carrier;
a third parallel axis gear fixed to the fourth shaft;
a fourth parallel axis gear a fixed to the third shaft and in mesh with the third parallel axis gear;
a brake to controllably inhibit rotation of the ring gear; and
a fifth shaft attached to the planet carrier and supporting a planet gear meshing with the sun gear and the ring gear;
at a first speed, outputting control signals with the controller to cause brake to inhibit rotation of the ring gear and to cause at least one of the electric motors to apply torque; and
at a second speed greater than the first speed, outputting control signals with the controller to release the brake and to cause at least one of the electric motors to apply torque.

10. The method of claim 9, wherein the simple planetary unit with parallel axis gearing is connected to torque sources consisting of electric motors comprising the first electric motor and the second electric motor.

11. A drivetrain architecture comprising:
a first electric motor;
a second electric motor; and
a simple planetary unit with fixed ratio parallel axis gearing with shafts fixed in space, the simple planetary unit comprising:
a first shaft fixed in space and connected to the first electric motor;
a sun gear attached to the first shaft;
a second shaft fixed in space;
a ring gear coupled to the second shaft via parallel axis gearing;
a third shaft connected to the second electric motor;
a planet carrier coupled to the third shaft via parallel axis gearing;
a fourth shaft supporting and fixed to the planet carrier;
a fifth shaft attached to the planet carrier and supporting a planet gear meshing with the sun gear and the ring gear; and
a brake directly connected to the ring gear.

12. The drivetrain architecture of claim 11, wherein the simple planetary unit with fixed ratio parallel axis gearing is connected to torque sources consisting of electric motors comprising the first electric motor and the second electric motor.

13. The drivetrain architecture of claim 12, wherein the fourth shaft is directly connected to a driveshaft output.

14. The drivetrain architecture of claim 13 further comprising:
a third parallel axis gear fixed to the fourth shaft; and
a fourth parallel axis gear a fixed to the third shaft and in mesh with the third parallel axis gear.

15. The drivetrain architecture of claim 12 further comprising:
a third parallel axis gear fixed to the fourth shaft; and
a fourth parallel axis gear a fixed to the third shaft and in mesh with the third parallel axis gear.

* * * * *